United States Patent
Kedem et al.

(10) Patent No.: US 7,166,188 B2
(45) Date of Patent: Jan. 23, 2007

(54) EVAPORATION DEVICE

(75) Inventors: Avraham Kedem, Weizmann Street 42, 76283, Rehovot (IL); Jack Gilron, Beer Sheva (IL); Ora Kedem, Rehovot (IL)

(73) Assignees: B.G. Negev Technologies and Applications Ltd., Be'er Sheva (IL); Avraham Kedem, Rehovot (IL)

( * ) Notice: Subject to any disclaimer, the term of this patent is extended or adjusted under 35 U.S.C. 154(b) by 456 days.

(21) Appl. No.: 10/015,222

(22) Filed: Dec. 10, 2001

(65) Prior Publication Data

US 2002/0079598 A1    Jun. 27, 2002

Related U.S. Application Data

(63) Continuation-in-part of application No. PCT/IL00/00324, filed on Jun. 6, 2000.

(30) Foreign Application Priority Data

Jun. 8, 1999    (IL) ..................................... 130357

(51) Int. Cl.
| | |
|---|---|
| B01D 1/16 | (2006.01) |
| B01D 1/22 | (2006.01) |
| F26B 3/12 | (2006.01) |

(52) U.S. Cl. ................. 159/48.2; 159/48; 159/DIG. 28; 239/251

(58) Field of Classification Search ............... 159/48.2, 159/48, DIG. 28; 239/251
See application file for complete search history.

(56) References Cited

U.S. PATENT DOCUMENTS

| 1,775,036 | A |   | 9/1930  | Dunning |
|---|---|---|---|---|
| 3,980,527 | A | * | 9/1976  | Lapeyre ...................... 202/175 |
| 4,001,077 | A | * | 1/1977  | Kemper ...................... 159/4.2 |
| 4,704,189 | A | * | 11/1987 | Assaf ......................... 159/48.2 |
| 5,188,550 | A | * | 2/1993  | Oliver ........................... 441/1 |
| 6,440,275 | B1| * | 8/2002  | Domen ....................... 202/234 |
| 6,500,216 | B1| * | 12/2002 | Takayasu ..................... 23/303 |

FOREIGN PATENT DOCUMENTS

| CA | 2 237 559 | 12/1998 |
|---|---|---|
| EP | 0340482   | 9/1993  |
| ES | 2 024 097 | 2/1992  |
| GB | 2330779   | 5/1999  |

OTHER PUBLICATIONS

English Abstract of ES 2 024 097 of Feb. 1992.

* cited by examiner

*Primary Examiner*—N. Bhat
(74) *Attorney, Agent, or Firm*—Ladas and Parry LLP

(57) ABSTRACT

An evaporation device for increasing evaporation from a surface of a body of liquid, comprises at least one evaporation element having at least one evaporation surface wettable by the liquid and at least partially exposable to wind when wetted, so as to allow evaporation of the liquid from the evaporation surfaces whereby the total evaporation area of the surface of the body of liquid is increased.

36 Claims, 13 Drawing Sheets

EVAPORATION DEVICE

This application is a continuation in part of PCT/IL00/00324 filed Jun. 6, 2000.

FIELD OF THE INVENTION

The present invention relates to an evaporation device using wind to increase the rate of evaporation from outdoor ponds.

BACKGROUND OF THE INVENTION

Devices of the above kind can be used in outdoor ponds where wastewater is stored and where evaporation is needed to concentrate the waste for further treatment. These ponds present an environmental challenge, as leakage from such ponds can lead to serious groundwater contamination. The requirements of environmental authorities regarding the quality of lining of such ponds are becoming more stringent and therefore the costs thereof tend to increase. For these reasons, there exists a need to reduce the number and size of such evaporation ponds by increasing the rate of evaporation therefrom.

Increasing the evaporation from ponds is also advantageous in the production of solid products like salts and minerals.

Known means of increasing evaporation from ponds of the above specified kinds include the use of spray nozzles to force the pond water into the air as a spray. Spraying, however, has been found to be environmentally dangerous as the wind can carry the spray drops beyond the catchment area of the pond to open ground, where the drops can then percolate down to the water table with their load of contaminants.

It is the object of the present invention to provide a new evaporation device.

SUMMARY OF THE INVENTION

The present invention makes use of the known phenomenon that increasing the surface area of a liquid exposed to wind, increases the rate of evaporation of the liquid.

In accordance with the present invention, there is provided an evaporation device for increasing evaporation from a surface of a body of liquid, comprising at least one evaporation element having at least one evaporation surface wettable by said liquid and at least partially exposable to wind when wetted, so as to allow evaporation of said liquid from said evaporation surface, whereby the total evaporation area of said surface of the body of liquid is increased.

By virtue of the present invention, the body of liquid is provided with auxiliary evaporation surfaces, which make use of wind to allow for effective heat and mass transfer, both of which are involved in increasing the evaporation process.

Preferably, the device further comprises means for periodically wetting said evaporation surface.

Preferably, said evaporation surface is constructed from a porous fabric.

Alternatively, the evaporation surface can be an irregularly or regularly shaped wettable solid such as volcanic rock (tuff), ceramic rings, Berl saddles, or other fill materials used in gas liquid contactors.

Preferably, said evaporation surface is exposable to wind in a position transverse to said surface of the body of liquid. Still more preferably, said evaporation surface is exposable to wind in a position substantially perpendicular to said surface of the body of liquid.

Preferably, the device further comprises orientation means for orienting said evaporation surface in the direction at least approximately parallel to the wind's direction.

Preferably, each evaporation element has at least two evaporation surfaces.

Preferably, the device comprises a plurality of evaporation elements.

BRIEF DESCRIPTION OF THE DRAWINGS

In order to understand the invention and to see how it may be carried out in practice, preferred embodiments will now be described, by way of non-limiting example only, with reference to the accompanying drawings, in which.

DETAILED DESCRIPTION OF PREFERRED EMBODIMENTS

Figure 4:
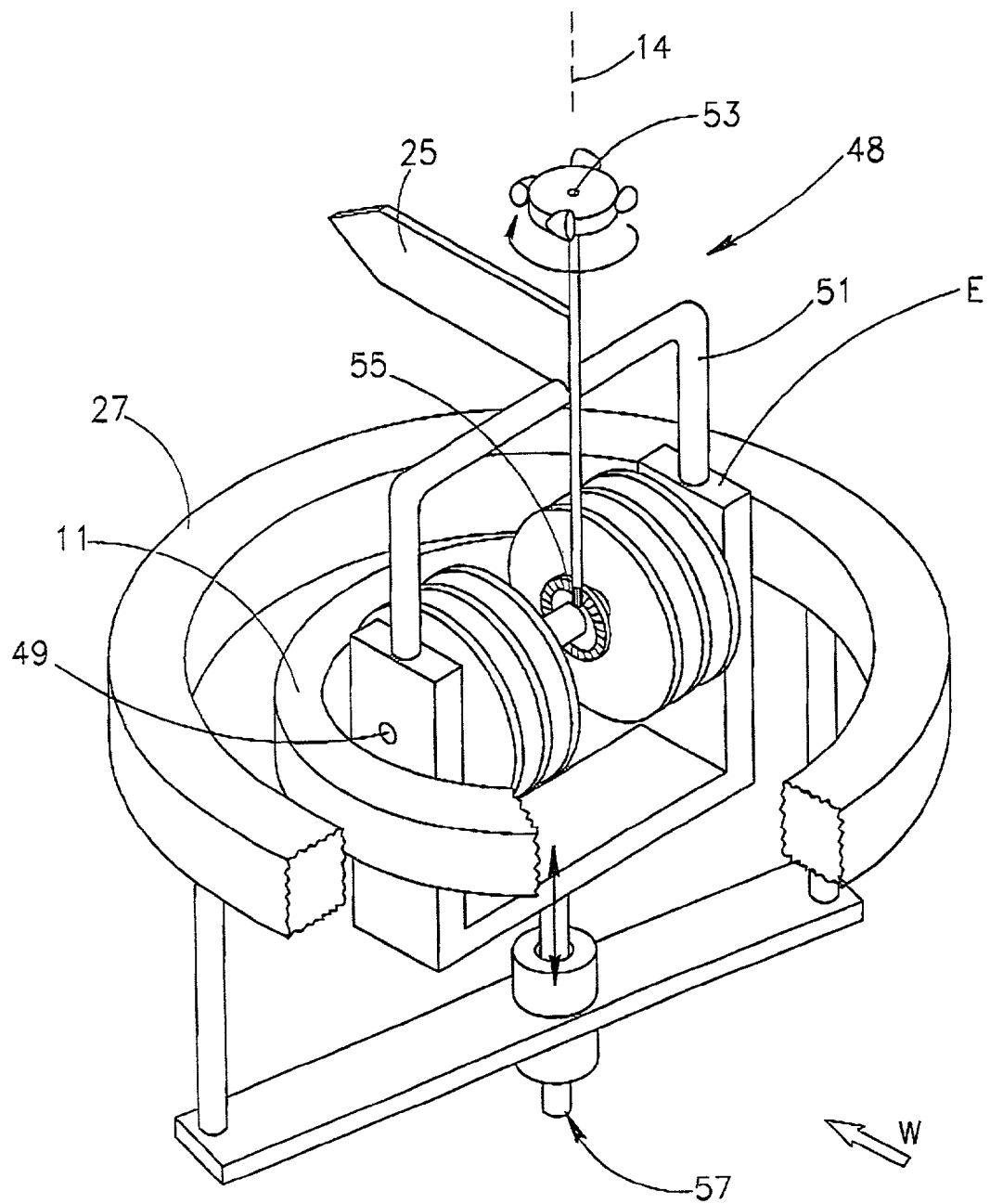
FIG. 4 is a perspective view of an evaporation device according to a still further embodiment of the present invention.
Figure 5:
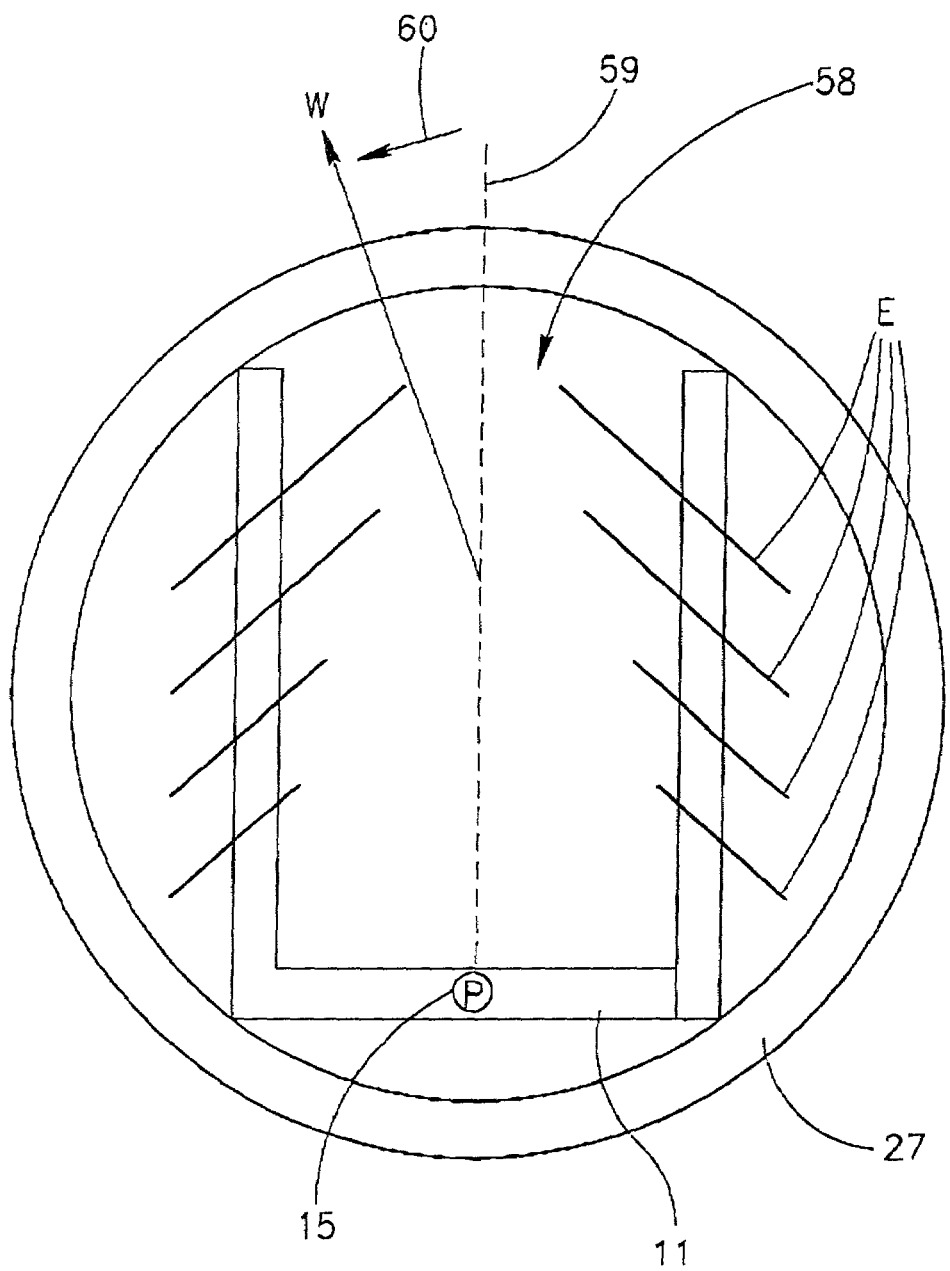
FIG. 5 is a top view of an evaporation device according to a still further embodiment of the present invention.
Figure 6A:
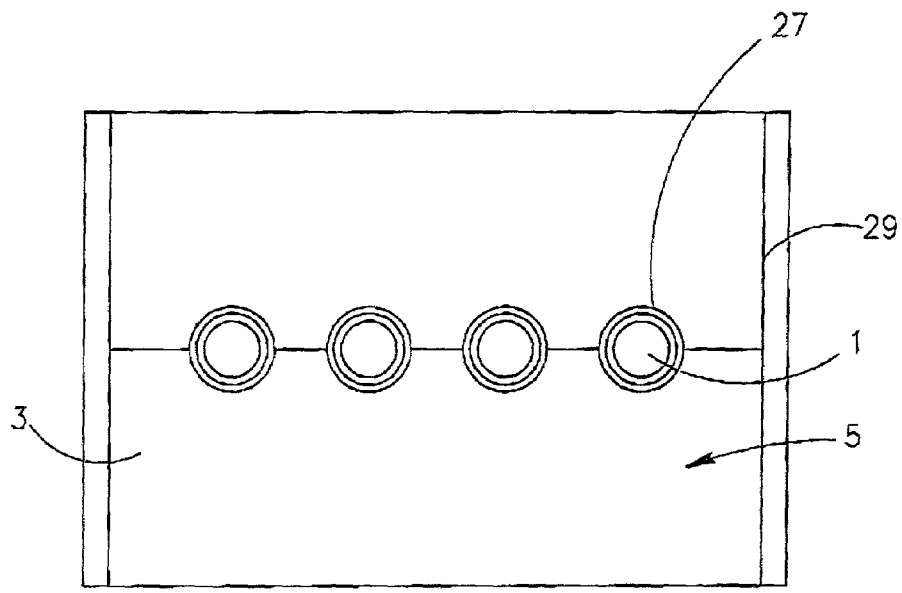
FIG. 6A is a top view of a possible arrangement of an evaporation device according to the present invention in a pond.
Figure 6B:
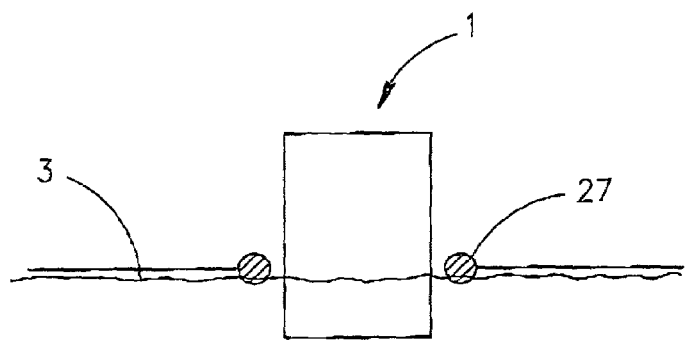
FIG. 6B is a side view of a possible arrangement of an evaporation device according to the present invention, in a pond.

FIGS. 1, 2, 3, 4 and 5 illustrate different embodiments of an evaporation device designed in accordance with the present invention, to increase the evaporation from a surface 3 of a liquid pond 5 shown in FIGS. 6A and 6B.

Figure 1:
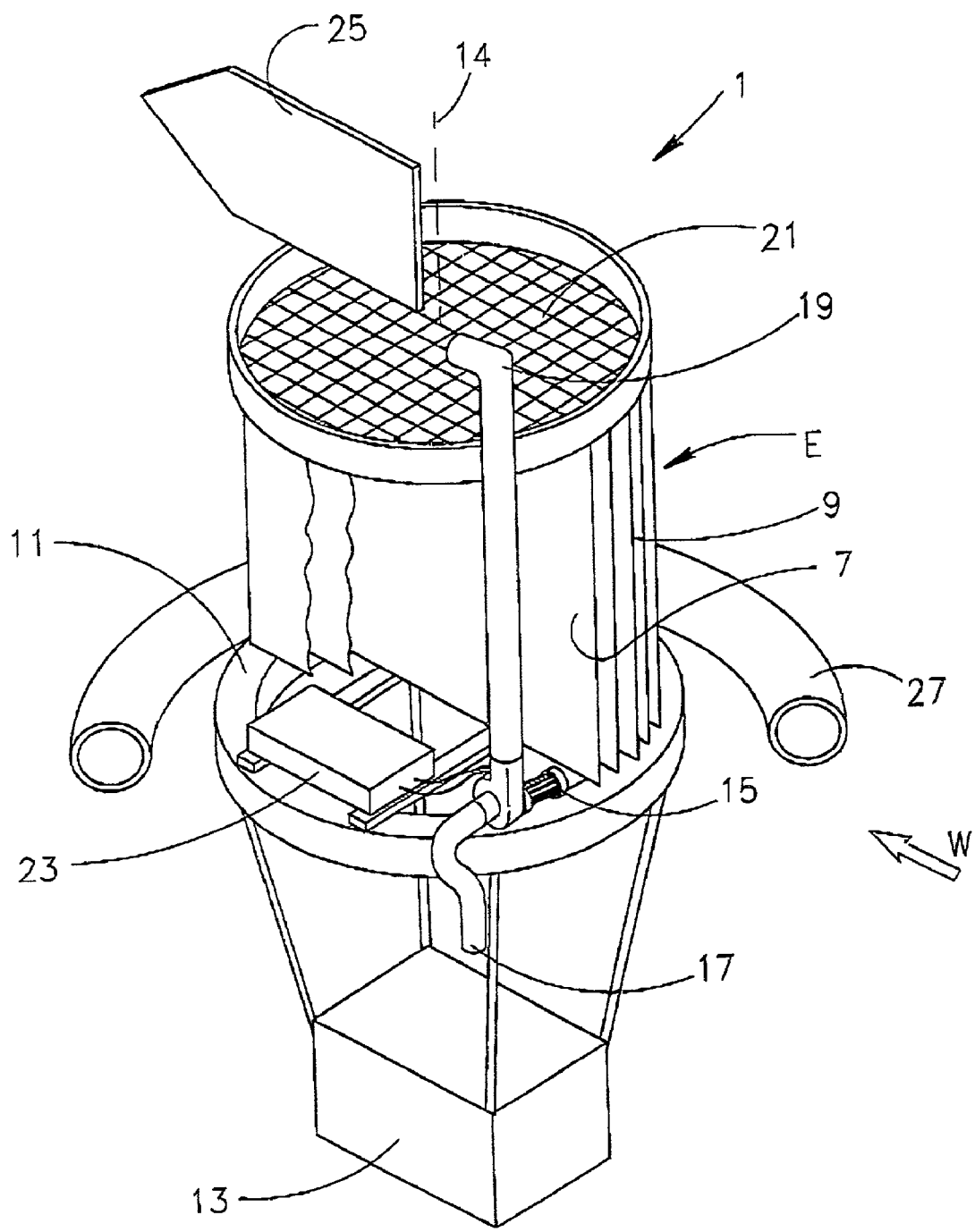
FIG. 1 is a perspective view of an evaporation device according to one embodiment of the present invention.

The evaporation device 1 shown in FIG. 1 has a plurality of evaporation elements E each having two evaporation surfaces 7 made from porous fabric which is stretched over vertical frames 9 in a sail-like manner. The evaporation device 1 is designed so as to enable the support of the evaporation elements E above the pond's surface 3 by meansof a float structure 11 which is made from buoyant material.

The float structure 11 is provided with a weight 13 which is suspended from it along an imaginary vertical axis 14 of the evaporation device 1 to ensure a low centre of gravity for the device 1 thereby keeping it upright on the pond's surface 3.

The evaporation device 1 has a wetting arrangement comprising a pump 15 having an inlet pipe 17 to the pond 5 and an outlet pipe 19 to a distribution system 21 mounted atop the evaporation surfaces 7. The pump 15 can be operated by a battery or by a solar power pack, each being controlled by a control circuit, mounted in a watertight box 23 placed on the float structure 11. To provide orientation of the evaporation surfaces 7 parallel to the direction of wind W, the evaporation device 1 has a wind vane 25 mounted thereatop.

In use, the evaporation device 1, or a plurality of such devices, is placed upon the surface 3 of the pond 5 preferably so that each is kept in position, while being free to rotate about its vertical, axis 14 in accordance with the wind direction. Such positioning arrangements may be in the form of float rings 27 tied between opposite banks 29 of the pond 5 (as in FIGS. 6A and 6B). The pump 15 periodically sucks liquid from the pond 5 and discharges it to the distribution system 21, which acts to pour the liquid over the evaporation surfaces 7. The liquid on the evaporation surfaces 7 is exposed to wind and therefore evaporates.

Figure 2:
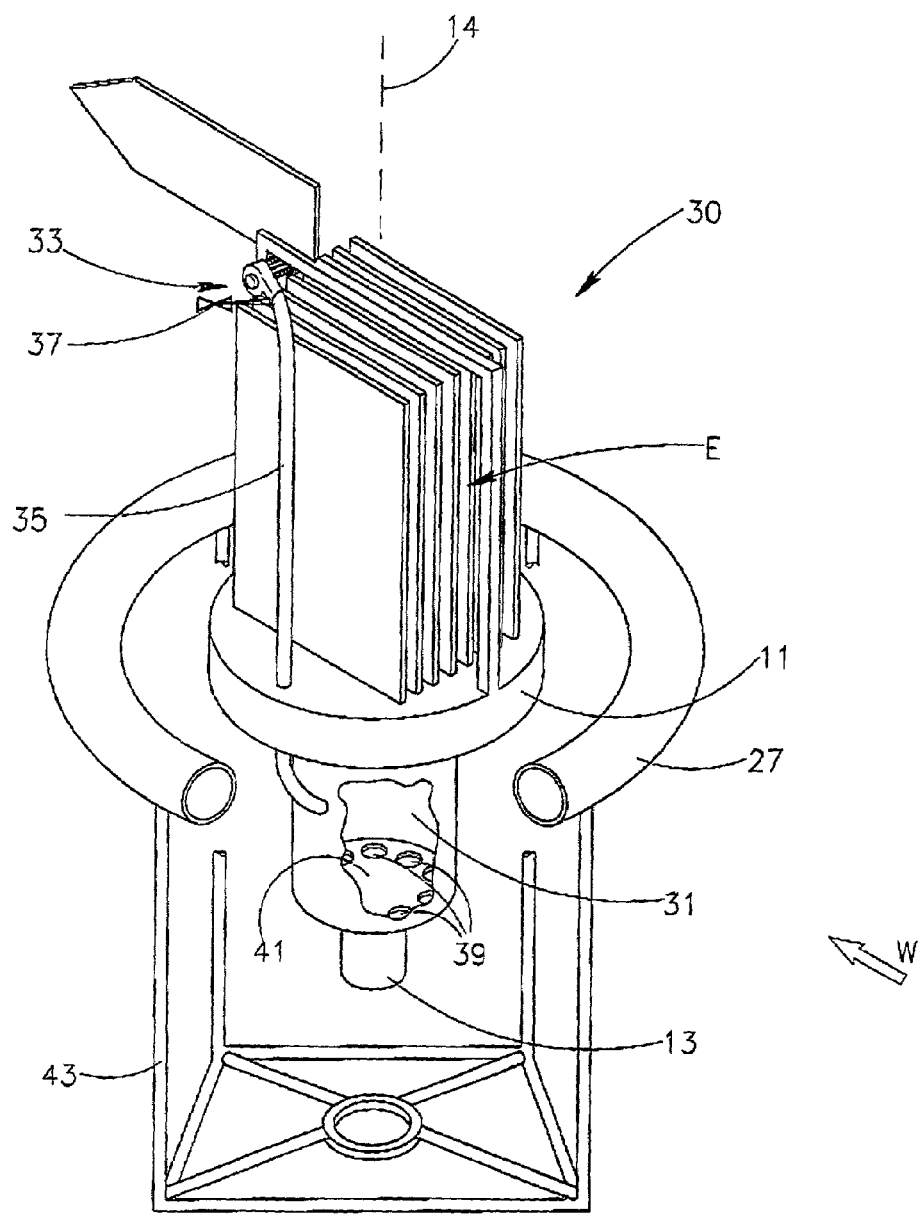
FIG. 2 is a perspective view of an evaporation device according to another embodiment of the present invention.

FIG. 2 shows the evaporation device 30 according to another embodiment of the present invention, wherein the wetting is achieved by periodical submerging the evaporation elements E into the pond 5. In the evaporation device 30, the wetting arrangement comprises a hollow ballast chamber 31 capable of regulating the buoyancy of the evaporation device 30 by alternatingly receiving thereinto air or liquid. The ballast chamber 31 is connected with an air compressor 33 via a conduit 35 and a vent valve 37 to enable a flow of compressed air into and out of the ballast chamber 31. The ballast chamber 31 is disposed underneath the float structure 11 and is provided with holes 39 on its underside 41 to enable a flow of liquid into and out of the ballast chamber 31. A weight 13 is attached to the underside 41 of the ballast chamber 31 to ensure a low centre of gravity and thereby keep the evaporation device 30 upright. The evaporation device 30 is designed so that the buoyancy of the ballast chamber 31 when filled with air, together with that of the float structure 11, slightly overbalances the evaporation device's weight to keep the evaporation device 30 buoyant. The air compressor 33 and the vent valve 37 can be activated in the same manner as the pump 15 in the previous embodiment.

In use, the periodic immersion of the evaporation elements E is performed by opening the vent valve 37 allowing the air initially trapped in the ballast chamber 31 to escape via the conduit 35. Liquid from the pond 5 enters the ballast chamber 31 via the holes 39 causing the evaporation device 30 to sink, thereby immersing the evaporation surfaces 7. When the evaporation surfaces 7 have been wetted they are raised by closing the vent valve 37 and activating the air compressor 33 which forces air into the ballast chamber 31. The air forces the liquid out of the ballast chamber 31 via the holes 39. The liquid on the evaporation surfaces 7 is exposed to wind and therefore evaporates. The evaporation device 30 is kept in position by the float ring 27 which in this embodiment is provided with a subsurface cage 43 to prevent the evaporation device 30 from sinking too deep, thereby keeping the air compressor 33 and the vent valve 37 above the pond's surface 3.

Figure 3:
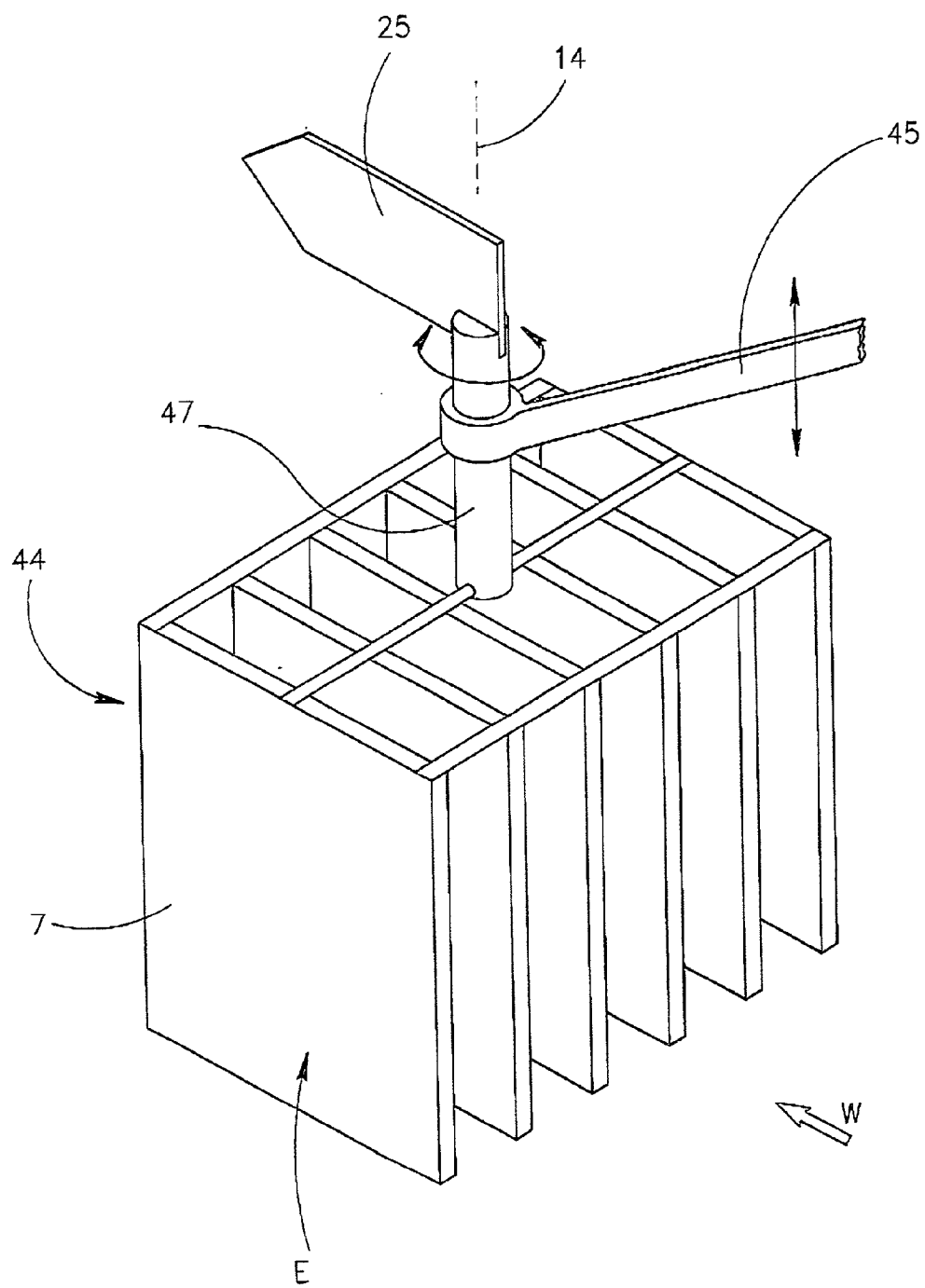
FIG. 3 is a perspective view of an evaporation device according to a further embodiment of the present invention.

FIG. 3 shows a further embodiment of the present invention, wherein the evaporation device 44 has evaporation elements E that are held by means of a boom 45 capable of movement in the vertical direction to periodically immerse the evaporation elements E in the pond 5. The evaporation elements F, are attached,to a vertical rod 47 which is rotatably mounted to the boom 45. A wind vane 25 is mounted on the vertical rod 47 which maintains a parallel orientation of the evaporation surfaces 7 to the wind direction W. In use, the boom 45 is mounted on a bank 29 of the pond 5, being raised to allow evaporation from the evaporation surfaces 7 and being lowered to immerse them in the pond 5 for rewetting.

FIG. 4 shows a further embodiment of the present invention, wherein the evaporation device 48 has evaporation elements E that are of a disk shape and are successively centrally mounted on a horizontal axle 49. The axle 49 is rotatably mounted on a frame 51 which is attached to a float structure 11. To control the rotation of the axle 49, the evaporation device 48 is provided with an anemometer type device 53 which is mounted on the frame 51, and connected to the axle 49 via a worm gear 55. A wind vane 25 is attached to the fame 51 to keep the evaporation elements E parallel to the wind direction W. The evaporation device 48 may be centrally mounted relative to the float ring 27 via a vertical shaft 57 attached to the frame 51.

In use, when the evaporation device 48 is placed upon the pond's surface 3, half of each evaporation surface 7 is immersed and the other half is exposed to the wind at any given time. Wind action causes the evaporation surfaces 7 to be rotated and therefore wetted.

FIG. 5 shows the evaporation device 58 according to a still further embodiment of the present invention, wherein the orientation control of the evaporation device 58 is achieved by mutual arrangement of the evaporation elements E, thereby negating the need for a wind vane 25 as in the evaporation devices 1, 30, 44 and 48, described previously. The evaporation elements E are mounted on the float structure 11 to be staggered on either side of an imaginary central horizontal axis 59 and to be transverse thereto. Due to this arrangement of the evaporation elements E, there is always a portion thereof that is acted upon by the wind to generate a torque 60 which rotates the evaporation device 58 keeping the horizontal axis 59 parallel to the wind direction W. Preferably, the evaporation elements E are designed so that those placed further downwind extend closer towards the central horizontal axis 59. The wetting of the evaporation surfaces 7 may be preformed by means of a pump 15 as in the device shown on FIG. 1 or by periodic submerging as in the other embodiments previously described.

Figure 7A:
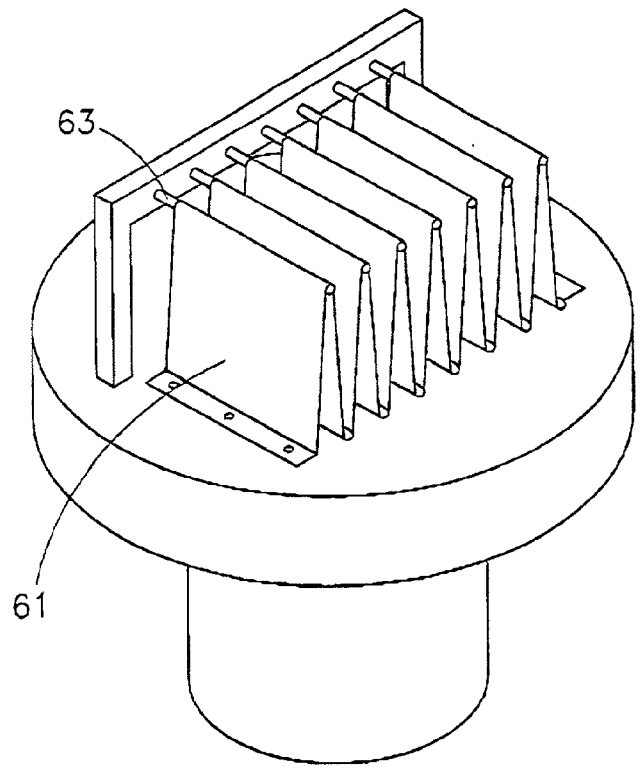
FIG. 7A illustrates an alternative design of evaporation surfaces of an evaporation device of the present invention.
Figure 7B:
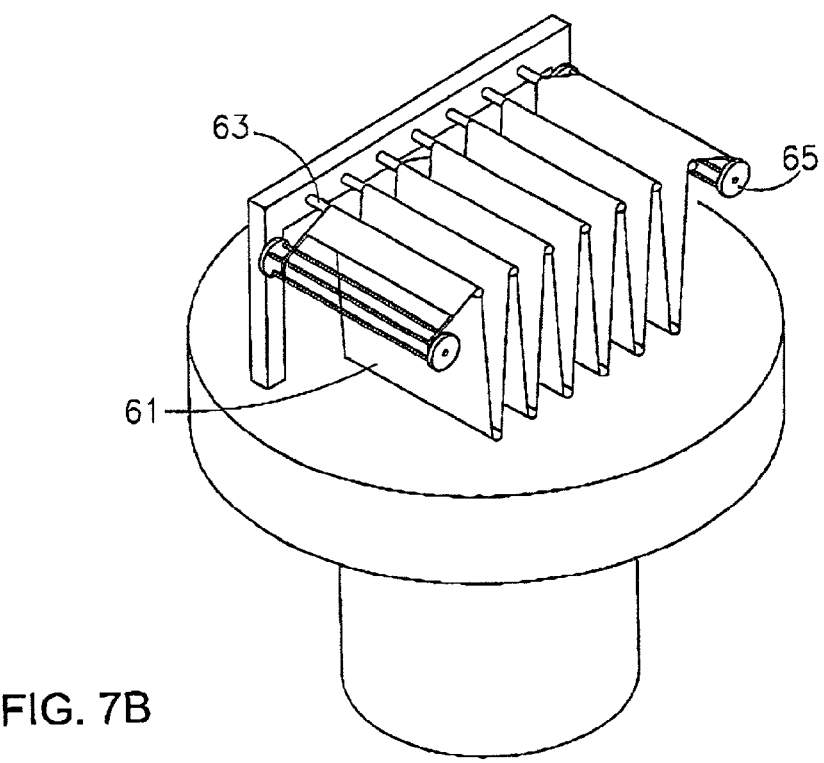
FIG. 7B illustrates another alternative design of evaporation surfaces of an evaporation device of the present invention.
Figure 7C:
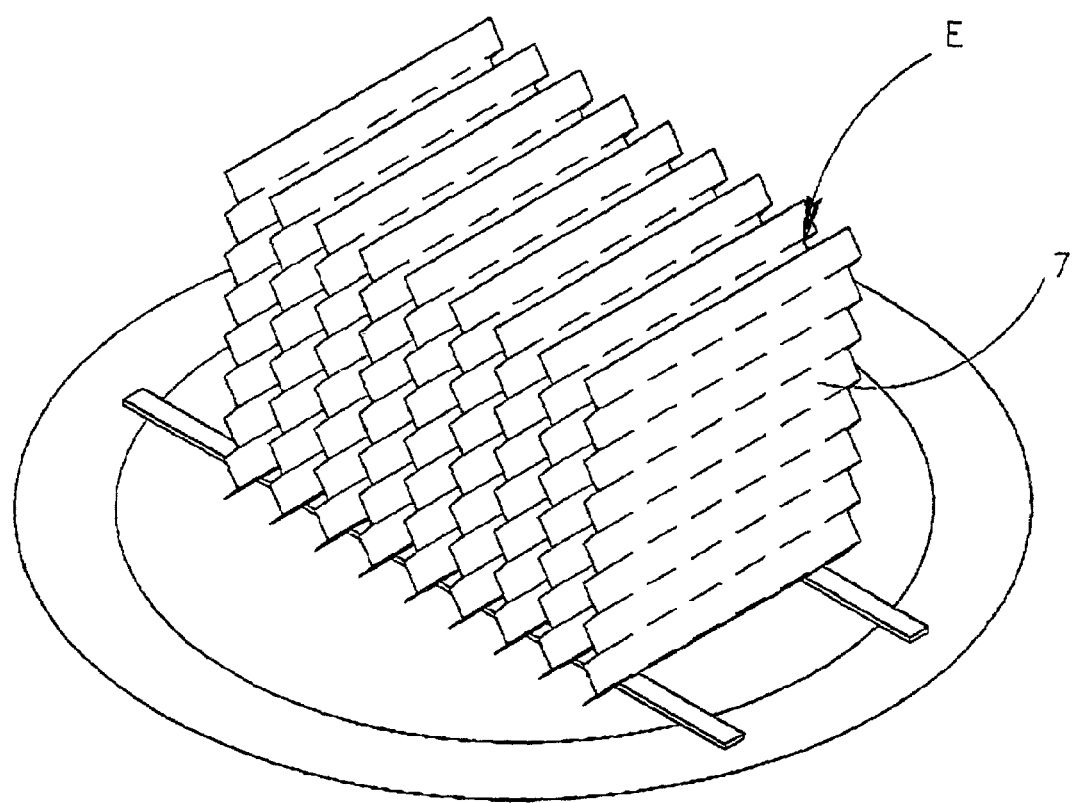
FIG. 7C illustrates a still other alternative design of evaporation of an evaporation device of the present invention.

In all the above evaporation devices 1, 30, 44, 48, 58, the evaporation surfaces 7 were shown to be separate planar elements. Alternative embodiments for the evaporation surfaces 7 are now shown in FIGS. 7A, 7B and 7C. FIG. 7A shows that a porous fabric may be mounted as a single sheet 61 on a series of guides 63. FIG. 7B shows that a fabric may be mounted as in FIG. 7A for periodic take up on rollers 65. This arrangement is advantageous for use in ponds that have a high salt concentration to break up salt deposits that accumulate on the evaporation surfaces 7. As one of the rollers 65 rolls up the sheet 61, the salt deposits are bent on the small radius of the guides 63 and thereby are broken up. FIG. 7C shows that in order to increase the surface area of the evaporation surfaces 7 without significantly increasing the height of the evaporation elements E, they may be corrugated surfaces. This may be advantageous for use in ponds that have a high salt concentration where accumulated salt deposits may be removed by stretching the folded evaporation surfaces 7 straight.

Figure 8:
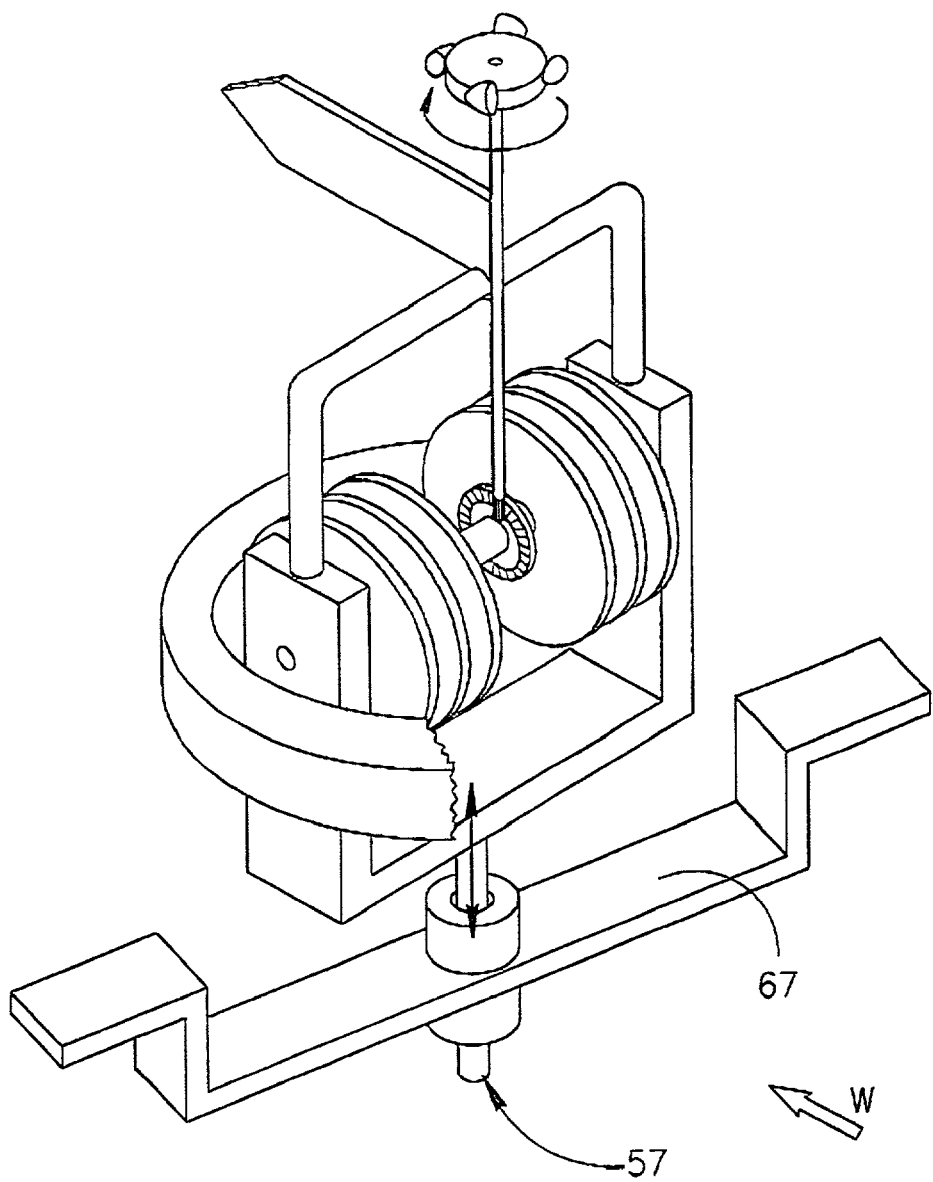
FIG. 8 is an alternative embodiment of the device shown in FIG. 4.

The above described embodiments of the evaporation device of the present invention, as shown in FIGS. 1 to 5, are not restricted to the positioning arrangements shown therewith. These arrangements may be interchangeable or rather they may have other designs instead of float rings, a positioning arrangement may be used such as, for example, a submerged fixed girder 67 which mounts the evaporation device 48 via a vertical shaft 57 as shown in FIG. 8.

FIGS. 9 to 12 illustrate embodiments of the evaporation device of the present invention, particularly suitable for mounting on a pond's bank rather than on a surface of a pond as described with respect to the previous embodiments. These devices may have substantially greater number of evaporation elements and/or greater area of evaporation surfaces than the devices of the previously described embodiments, since they do not need to be light as in the case of mounting on a surface of a pond. Also, the devices adapted for mounting on a pond's bank may be supplied with catwalks or ladders to provide excess to any individual evaporation element.

Figure 9:
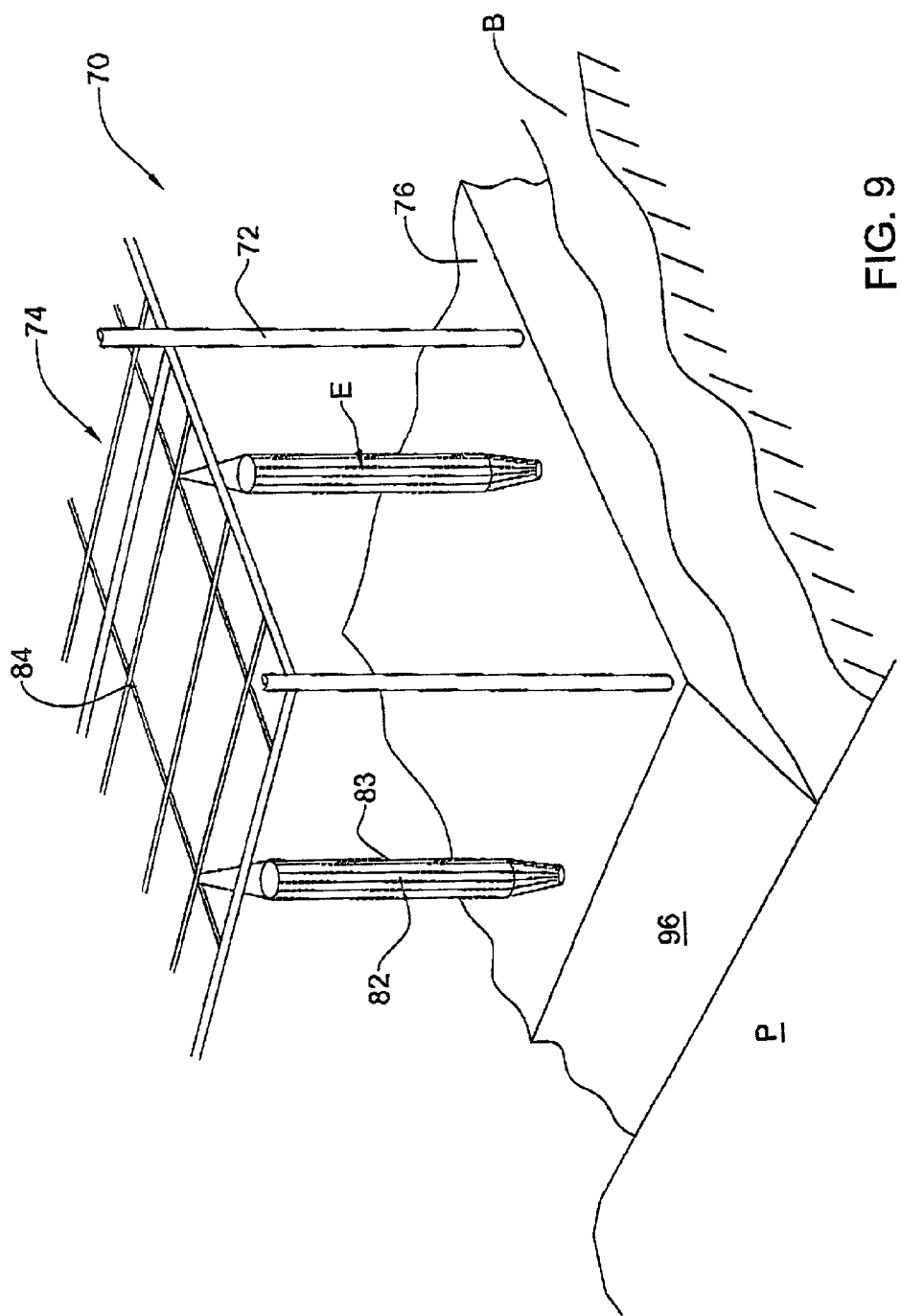
FIG. 9 illustrates an evaporation device of the present invention particularly suitable for mounting the device on a pond's bank.

As shown in FIG. 9, the evaporation device 70 comprising a scaffold 72 mounted on a bank B of a pond P and provided with a liquid distribution system 74 at the top thereof, a non-porous bottom surface 76 and a plurality of evaporation elements E. The evaporation device 70 is provided with a pump (not shown) for supplying liquid from the pond to the distribution system 74.

Figure 10:
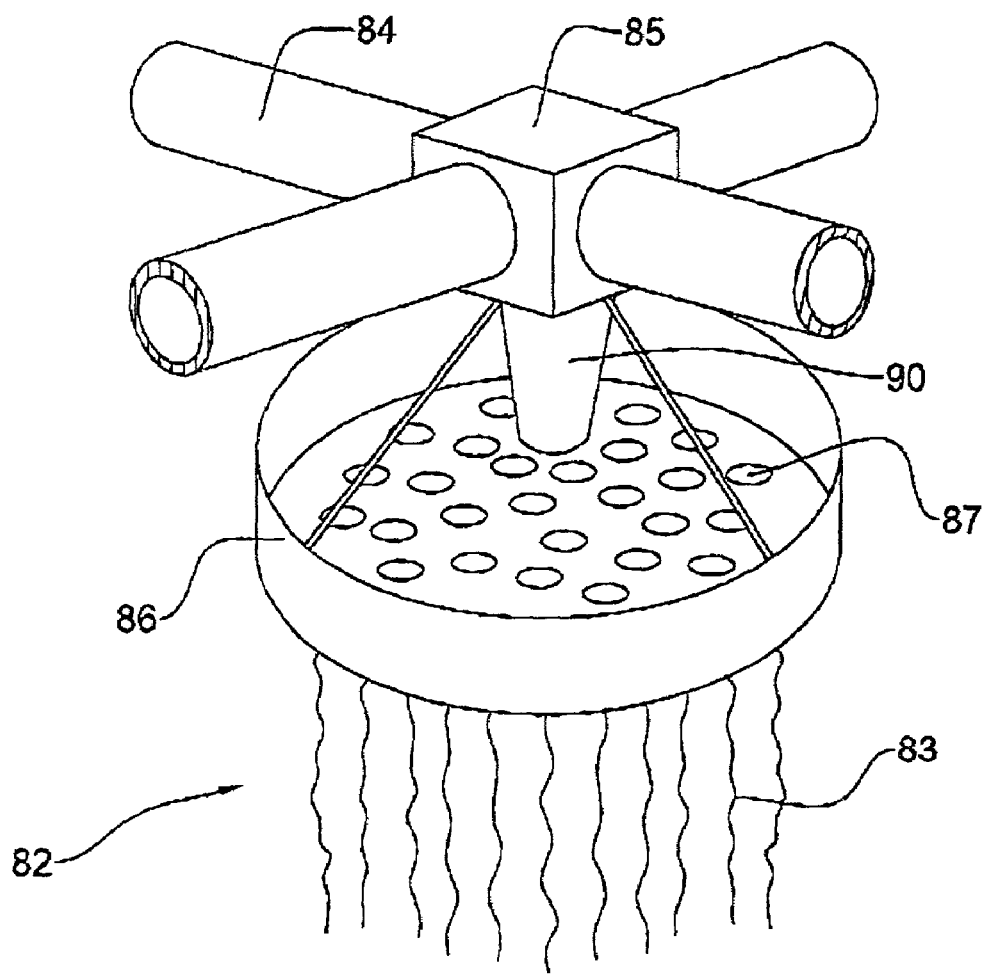
FIG. 10 is an enlarged illustration of detail J in FIG. 9.

Each evaporation element E is in the form of a bundle 82 of wettable filaments 83 and as better seen in FIG. 10, the liquid distribution system comprises piping grid 84 with junctions 85 each associated with a tray 86 formed with perforations 87 to which upper ends of the filaments 83 of each such bundle 82 is attached. Each junction 85 has a nozzle 90 through which liquid from the piping grid 84 is supplied to its associated tray 86 to wet tie filaments 83. Lower ends of the filaments 83 are attached to the bottom surface 76, as shown in FIG. 9.

As further shown in FIG. 9, the non-porous bottom surface 76 has a slope 96 inclined downwardly towards the pond P and extending to the pond's edge so as to guide to the pond excess liquid used for wetting the filaments 83. The bottom surface 76 preferably bas raised edges (not shown) preventing the excess liquid is from reaching the ground and seeping into the soil. Alternatively, the bottom surface may have drain pipes (not shown) extending towards the pond P and inclined to allow the drainage of tile excess liquid by gravity.

Figure 11:
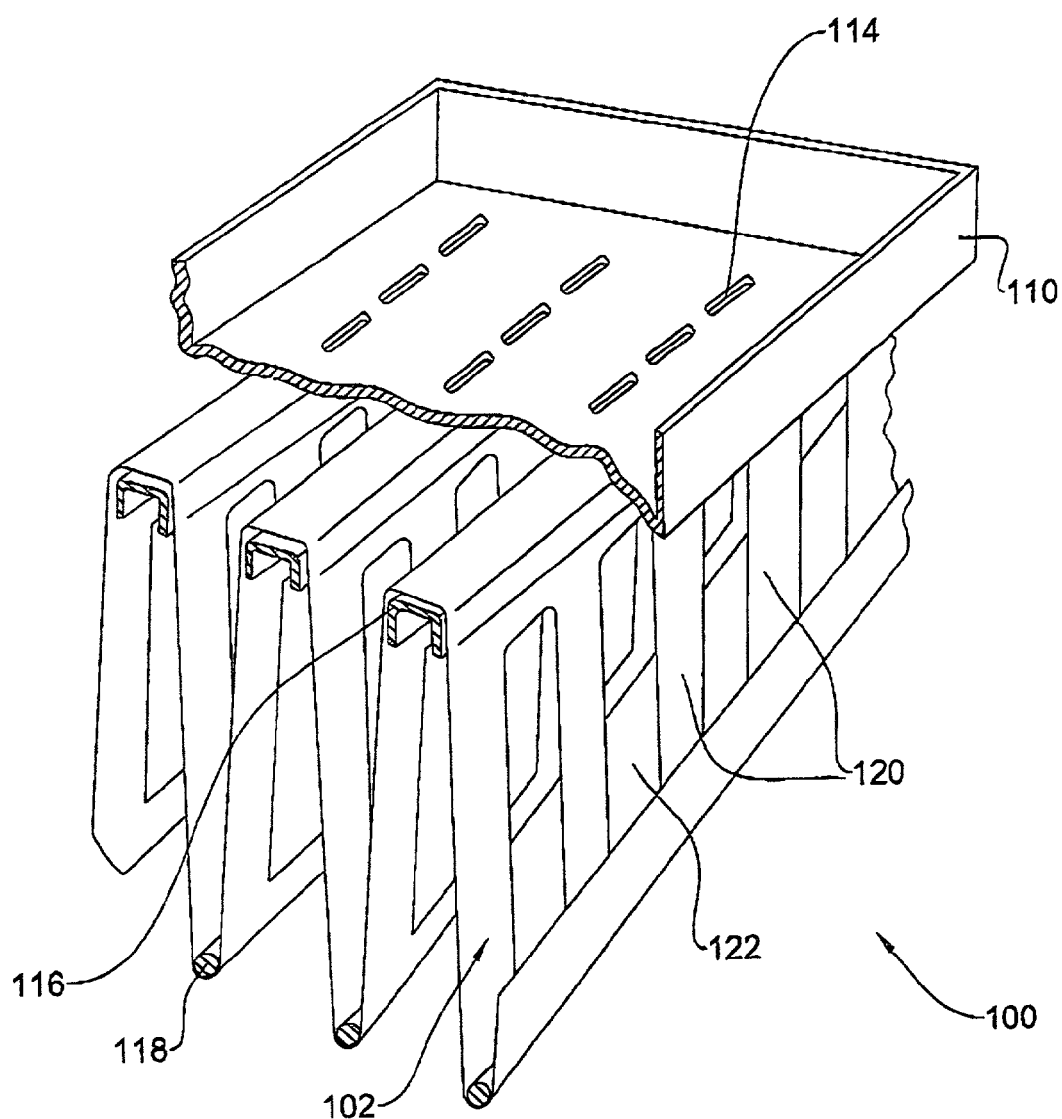
FIG. 11 illustrates an another embodiment of an evaporation suitable for mounting on a pond's bank.
Figure 12:
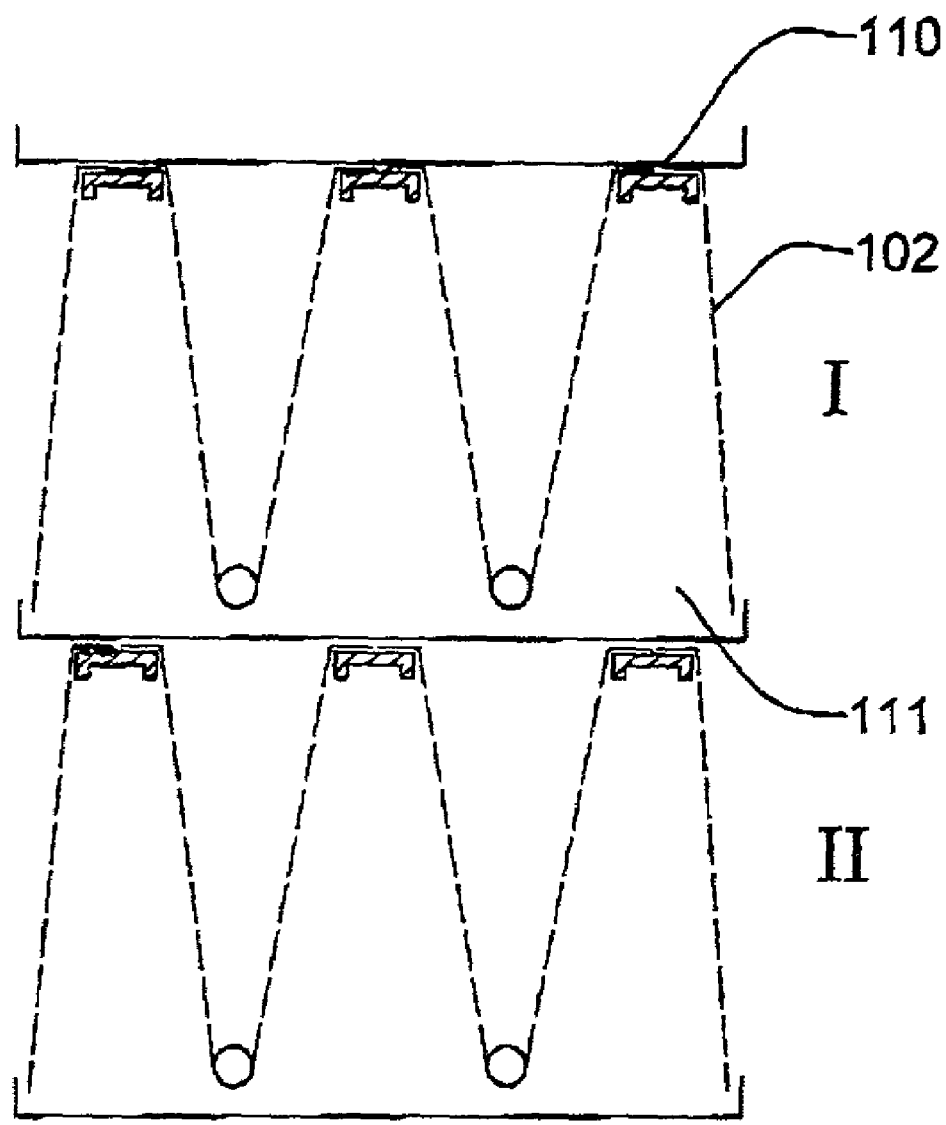
FIG. 12 illustrates a side view of a multistory arrangement of the device shown in FIG. 11.

FIG. 11 shows a fragment of an evaporation device 100 designed for mounting on a pond's bank, the device having evaporation surfaces 102 designed similarly to those of the evaporation device shown in FIG. 7B, but arranged in two stories I and II as schematically shown in FIG. 12. It should be mentioned here that the two stories are shown here solely for the purpose of illustration and that devices according to the present invention may clearly have any other number of stories.

As seen in FIG. 12, the evaporation device has an upper, feeding trough 110 at each story thereof for receiving liquid pumped from the pond and wetting the evaporation surfaces 102 and a lower, collecting trough 111 for collecting herein excess liquid. As shown, the receiving trough 111 of the story I may serve as feeding trough 110 of the story II located thereunder.

Reverting to FIG. 11, the feeding trough 110 is mounted above the evaporation surfaces 102 and has slots 114 for wetting therethrough these surfaces. The evaporation surfaces 102 are held by stiff horizontal beams 116 in secure contact along the slots 114 with feeding though 110, and carry weighted bars 118 which keep the evaporation surfaces 102 vertical and from moving far out of place. The evaporation surfaces 102 are in the form of a plurality of strips 120 formed between a plurality of cutouts 122 extending along most of the height of the surfaces 102. As shown, the strips are relatively narrow to be able to turn in the wind to stay essentially parallel to the wind direction.

For all embodiments described above, the fabric of the evaporation surfaces may be made of any synthetic or natural fibre that can be wetted by the liquid without significantly reducing the vapour pressure of the liquid as a result of chemical interactions between the liquid and the fibre. The fabric of which the evaporation surfaces are made may also be non-woven, e.g. may be in the form of sleeves such as used in geotextiles and agrotextiles. The same materials may be in the form of strips tin enough to turn in the wend to maintain their surfaces parallel to the wind direction.

Experimental results, conducted by the authors, demonstrate that die use of an evaporation device according to the present invention can significantly increase the evaporation from a pond's surface. In one experiment, the ratio of available evaporating area between a device pond and a control pond was 6 to 1. An eight-fold improvement in evaporation over the reference pond's evaporation was recorded in the device pond during a 24-hour interval.

The advantages of the present invention include the localised evaporation on the evaporation surfaces thus preventing contamination of surrounding ground, the use of inexpensive materials giving low evaporation costs, low maintenance costs due to the simple construction of the device and a relatively low total weight.

While the invention has been described with respect to preferred embodiments, it will be appreciated that many variations, modifications and other applications of the invention can be made. The wetting or holding arrangements of the evaporation elements may be of different designs. The evaporation surfaces do not necessarily need to be perpendicular to the pond's surface or the ground. It is also possible to generate an artificial wind using fans or blowers mounted on the float structures or on the pond's banks during seasons of little wind. Such fans could be solar powered to save on the use of electricity.

The invention claimed is:

1. An evaporation device for increasing a concentration of a solid in a body of a liquid comprising the solid, said evaporation device comprising:
    (a) at least one evaporation element comprising evaporation surface means for facilitating evaporation of the liquid by heat and mass transfer when the evaporation surface means is wetted with the liquid and exposed to wind at an outdoor environment, said at least one evaporation element being free of any external enclosure surrounding the evaporation element and preventing its exposure to said outdoor environment,
    (b) wetting means for wetting at least one portion of the evaporation surface means of the at least one evaporation element with liquid from the body of liquid, either by displacement of liquid from the body of liquid to the at least one portion or by immersion of the at least one portion into the body of liquid, so as to facilitate evaporation of the liquid by heat and mass transfer and thereby to increase concentration of the solid in the body of liquid;

(c) orientation means for orienting said evaporation surface means in a direction at least approximately parallel to the wind direction; and (d) support means for supporting the at least one evaporation element, wetting means and orientation means with the wetting means disposed for wetting the evaporation surface means of the at least one evaporation element whereby the rate of said evaporation and the total evaporation area of a surface of the body of liquid are increased.

2. An evaporation device according to claim 1, wherein said device further comprises wetting means for periodically wetting said evaporation surface by displacement of liquid from the body of liquid to the at least one portion.

3. An evaporation device according to claim 1, wherein said wetting means comprise immersing means for at least partially immersing said evaporation surface means in said body of liquid.

4. An evaporation device according to claim 3, wherein said immersing means comprise ballast chamber means, including a ballast chamber, for regulating the buoyancy of the device by alternating receiving thereinto a gas or a liquid.

5. An evaporation device according to claim 4, wherein said immersing means further comprise air compressor means for forcing air into said ballast chamber, said chamber having openings to allow liquid thereinto.

6. An evaporation device according to claim 3, wherein said immersing means comprise means for applying a mechanical force to the device to at least partially immerse said evaporation surface in said body of liquid.

7. An evaporation device according to claim 6, wherein said immersing means comprise an elongated rigid member movable in the direction perpendicular to a surface of the body of liquid.

8. An evaporation device according to claim 3, wherein said wetting means comprise means for acting to rotate said evaporation surface means, thereby partially immersing it in said body of liquid.

9. An evaporation device according to claim 8, wherein said wetting means comprise anemometer means for controlling rotation of the evaporation surface means.

10. An evaporation device according to claim 1, wherein said wetting means comprise means for acting to pour said liquid onto said evaporation surface means.

11. An evaporation device according to claim 10, wherein said wetting means comprise a liquid pump and a distribution system connected therewith.

12. An evaporation device according to claim 1, wherein said evaporation surface means is exposable to wind in a position transverse to a surface of the body of liquid.

13. An evaporation device according to claim 1, wherein said orientation means comprise a wind vane.

14. An evaporation device according to claim 1, wherein said device comprises means for making the device capable of at least temporarily floating on said surface of the body of liquid.

15. An evaporation device according to claim 1, wherein said evaporation surface means comprises a porous fabric.

16. An evaporation device according to claim 1, wherein said evaporation surface means is of a corrugated shape.

17. An evaporation device according to claim 1, wherein said evaporation surface means has at least two evaporation surfaces.

18. An evaporation device according to claim 1, wherein the device comprises a plurality of evaporation elements.

19. An evaporation device according to claim 1, wherein said evaporation surface means, when wetted, is exposable to said outdoor environment from a majority of directions.

20. An evaporation device according to claim 1, wherein said body of liquid is a pond and said device is adapted for being at least partially mounted on a bank of the pond.

21. An evaporation device according to claim 20, wherein, said wetting means are capable of acting to pour said liquid onto said evaporation surface means and said wetting means comprise a liquid pump and a distribution system connected therewith, and further comprising a scaffold adapted for being mounted on a bank of the pond and carrying said at least one evaporation element with said evaporation surface means comprising one or more evaporation surfaces, and guiding means for guiding excess liquid used for wetting said evaporation surface means back to the pond.

22. An evaporation device according to claim 21, wherein the distribution system is disposed at the top of said scaffold and the system comprises at least one perforated tray for receiving liquid from said pond and wetting said evaporation surfaces through the perforations.

23. An evaporation device according to claim 22, wherein said tray is common for all the evaporation surfaces.

24. An evaporation device according to claim 22, comprising a plurality of evaporation elements and each element is provided with its own tray.

25. An evaporation device according to claim 21, wherein the distribution system comprises a piping grid with a plurality of nozzles for wetting, at least indirectly, said evaporation surfaces.

26. An evaporation device according to claim 21, wherein said scaffold comprises a bottom surface for collecting said excess liquid and preventing it from reaching the ground and seeping into the soil.

27. An evaporation device according to claim 26, wherein said bottom surface is non-porous and constitutes the guiding means and it has a slope inclined downwardly towards said pond and is designed to extend to a pond's edge to let the excess liquid flow to the pond under gravity.

28. An evaporation device according to claim 26, wherein said bottom surface is associated with drain pipes inclined and extending towards a pond's edge to drainage of the excess water through these pipes to the pond.

29. A kit comprising at least one evaporation device according to claim 1, and further comprising at least one positioning means for keeping said evaporation device in position on a surface of a body of liquid.

30. A kit according to claim 29, wherein said positioning means comprises a float ring.

31. A kit according to claim 29, wherein said kit comprises a plurality of the evaporation devices.

32. A kit according to claim 29, wherein said kit comprises a plurality of the positioning means.

33. An evaporation device according to claim 1 comprising a plurality of evaporation elements with each of the plurality of evaporation elements having a plurality of evaporation surfaces, wherein the support means supports the plurality of evaporation elements in spaced relation to one another in the body of liquid without any enclosure surrounding the plurality of evaporation elements, wherein the orientation means orient the evaporation surfaces of the plurality of evaporation elements in a direction at least approximately parallel to a direction of wind, said support means comprising means for supporting the orientation means above the plurality of evaporation elements.

34. The evaporation device according to claim 1, wherein the support means comprises floatation means for maintaining the evaporation device afloat on the body of liquid with the at least one portion of the at least one evaporation element above the surface of the body of liquid at least after the at least one portion has been wetted with liquid from the body of liquid.

35. An evaporation device according to claim 1, wherein the evaporation surface means comprises a porous fabric.

36. An evaporation device according to claim 1, wherein the evaporation surface means comprises a wettable solid.

* * * * *